US012535058B1

United States Patent
Wen et al.

(10) Patent No.: US 12,535,058 B1
(45) Date of Patent: Jan. 27, 2026

(54) CONTROL METHOD FOR DE-ICING BLADES OF A WIND POWER GENERATOR

(71) Applicants: Huaneng Shaanxi Zichang Power Generation Co., Ltd., Shaanxi (CN); HUANENG DINGBIAN NEW ENERGY POWER GENERATION CO., LTD., Shaanxi (CN)

(72) Inventors: Le Wen, Shaanxi (CN); Feng Chang, Shaanxi (CN); Jun Liu, Shaanxi (CN); Yonghua Wu, Shaanxi (CN); Jinlu Hu, Shaanxi (CN); Yanqing Sun, Shaanxi (CN); Fabo Wang, Shaanxi (CN)

(73) Assignees: Huaneng Shaanxi Zichang Power Generation Co., Ltd., Yan'an (CN); HUANENG DINGBIAN NEW ENERGY POWER GENERATION CO., LTD., Yulin (CN)

( * ) Notice: Subject to any disclaimer, the term of this patent is extended or adjusted under 35 U.S.C. 154(b) by 0 days.

(21) Appl. No.: 19/239,893

(22) Filed: Jun. 16, 2025

(30) Foreign Application Priority Data

Oct. 10, 2024 (CN) .......................... 202411406208.3

(51) Int. Cl.
  *F03D 80/40* (2016.01)
(52) U.S. Cl.
  CPC .................. *F03D 80/405* (2023.08)
(58) Field of Classification Search
  CPC ...... F03D 17/013; F03D 17/018; F03D 80/40; F03D 80/401; F03D 80/402; F03D 80/403; F03D 80/405; F03D 80/60; F03D 80/602

See application file for complete search history.

(56) References Cited

U.S. PATENT DOCUMENTS 11,703,035 B2 * 7/2023 Arlaban Gabeiras ....................... F03D 7/0224 416/1

FOREIGN PATENT DOCUMENTS

| CN | 107781121 A | 3/2018 |
|----|-------------|--------|
| CN | 116658382 A | 8/2023 |
| CN | 118094905 A | 5/2024 |

* cited by examiner

*Primary Examiner* — Nathaniel E Wiehe
*Assistant Examiner* — Jason G Davis

(57) ABSTRACT

Provided is a control method for de-icing blades of a wind power generator, including: Step S101: performing real-time monitoring of temperature of a surface of a blade of the wind power generator, and constructing a first positional temperature sequence at a time interval of v; and Step S102: calculating actual temperature at each position on the surface of the blade of the wind power generator according to the positional temperature sequence, and generating a second positional temperature sequence. In the present disclosure, it can be avoided that a discrepancy between the temperature acquired and the actual temperature of the surface of the wind power generator; and weight differences that may exist among three blades are taken into account, and synchronous de-icing operations are performed after eliminating the weight differences, so that ice treatment can be achieved without shutdown, and the stable operation of the wind power generator can be ensured.

6 Claims, 4 Drawing Sheets

CONTROL METHOD FOR DE-ICING BLADES OF A WIND POWER GENERATOR

CROSS-REFERENCE TO RELATED APPLICATIONS

This application claims priority of Chinese Patent Application No. 202411406208.3, filed on Oct. 10, 2024, the contents of which are hereby incorporated by reference.

TECHNICAL FIELD

The present disclosure relates to the technical field of de-icing a wind power generator, and more specifically, to a control method for de-icing blades of a wind power generator.

BACKGROUND

Wind power generation is one of the important sources of clean energy. However, in winter, the temperature is relatively low, and the phenomenon of overall or local icing occurs on the surfaces of the blades after rainy and snowy weather, which may result in the following impacts:
1. change in blade airfoil: due to the uneven ice layer coverage, the aerodynamic characteristics of the blades are damaged, resulting in a decrease in efficiency;
2. increase in structural load: icing increases the weight of the blades, causing imbalance and increasing the mechanical load on the blade and the whole machine;
3. reduction in power generation efficiency: blade deformation directly affects the wind energy capture rate and reduces power output;
4. shortened service life of wind turbine unit: frequent changes in mechanical stress will accelerate the wear of the components of the wind power generator, especially the transmission system and connecting parts;
5. safety hazards: ice layer shedding may cause harm to surrounding facilities or personnel, especially the risk is greater at high wind speeds;

Therefore, icing of the blades of the wind power generator is a complex but must-be-solved problem. It not only affects the efficiency and safety of the wind power generator but also increases maintenance costs.

SUMMARY

The present disclosure provides a control method for de-icing blades of a wind power generator, to solve the technical problem in the related art of de-icing surfaces of the blades of the wind power generator.

The present disclosure provides a control method for de-icing blades of a wind power generator, including the following steps: Step S101: performing real-time monitoring of temperature of a surface of a blade of the wind power generator, and constructing a first positional temperature sequence at a time interval of v, the first positional temperature sequence including u units, and 1 unit representing temperature at a corresponding position on the surface of the blade of the wind power generator;

Step S102: calculating actual temperature at each position on the surface of the blade of the wind power generator according to the first positional temperature sequence, and generating a second positional temperature sequence;

Step S103: acquiring all second positional temperature sequences from current time to past Y hours to calculate a thickness of an ice layer at the each position on the surface of the blade of the wind power generator, and generating an ice layer thickness sequence, the ice layer thickness sequence including u units, and 1 unit representing the thickness of the ice layer at a corresponding position on the surface of the blade of the wind power generator; and Step S104: calculating a de-icing scheme according to the ice layer thickness sequence, and performing de-icing on the each position of the blade of the wind power generator by heating in accordance with the de-icing scheme;

the de-icing scheme including de-icing temperature for the each position of the blade of the wind power generator; and Y, u, and v being self-defined parameters;

where a temperature sensor is disposed at the each position within the blade of the wind power generator, and temperature of the surface of the blade of the wind power generator is acquired through the temperature sensor at the each position;

where step of calculating the actual temperature at the each position on the surface of the blade of the wind power generator includes:

Step S201, acquiring a heat conductivity of a material of the blade of the wind power generator, as well as a material thickness and a heat exchange coefficient at the each position;

Step S202, calculating the actual temperature $T_{surf}$ at the each position on the surface of the blade of the wind power generator, a formula for calculating being specifically as follows:

$$T_{surf} = T_{int} + \frac{T_{int} - T_{amb}}{\frac{t}{k} + \frac{1}{h \cdot A}};$$

in the formula, $T_{int}$ represents the temperature acquired by the temperature sensor; k represents the heat conductivity of the material of the blade of the wind power generator; $T_{amb}$ represents ambient temperature; h represents the heat exchange coefficient of the material of the blade of the wind power generator; A represents a heat conduction area of the corresponding position; and t represents the material thickness at the corresponding position on the blade of the wind power generator.

Further, step of calculating the thickness of the ice layer at the each position on the surface of the blade of the wind power generator includes:

Step S301, acquiring ambient temperature, wind speed, and humidity information of the current time to the past Y hours;

Step S302: presetting a first temperature change rate, and selecting the actual temperature at the each position of the surface of the wind power generator during a last time an ambient temperature change rate exceeded the first temperature change rate;

the first temperature change rate being a self-defined parameter;

Step S303, calculating an actual temperature change rate at the each position of the surface of the wind power generator, and judging whether the actual temperature change rate at the each position of the surface of the wind power generator is equal to the ambient temperature change rate; and if yes, determining that icing occurs at the corresponding position, and proceeding to Step S304; and if not, determining that icing does not occur, and ending;

Step S304, calculating the thickness of the ice layer at an icing position.

Further, a method for acquiring the thickness of the ice layer at the icing position is specifically as follows:

presetting M ice layer thicknesses, each ice layer thickness corresponding to one temperature change rate, and matching a corresponding ice layer thickness according to the actual temperature change rate at the each position of the surface of the blade of the wind power generator during the last time the ambient temperature change rate exceeded the first temperature change rate, and denoting the corresponding ice layer thickness as an initial ice layer thickness $h_{initial}$.

Further, a current ice layer thickness $h_{current}$ is calculated according to the initial ice layer thickness and the ambient temperature $T_{amb}$, the wind speed $V_{wind}$, and the humidity information $f_{humidity}$, a formula for calculating being specifically as follows:

$$h_{current}=h_{initial}+\alpha\times(T_{dew\ point}-T_{amb})\times V_{wind}\times t_1\times(f_{humidity}\times\beta);$$

in the formula, a presents a self-defined empirical coefficient; $T_{dew}$ point represents an environment dew point temperature; $t_1$ represents a time interval from occurrence of the initial ice thickness to the current time; $\beta$ represents a weight parameter related to the humidity information $f_{humidity}$ and is a self-defined parameter.

Further, steps of calculating the de-icing scheme are as follows:

Step S401, calculating an ice layer thickness change rate $$\frac{dt_i}{dt}$$

at each icing position according to the thickness of the ice layer at the each position on the surface of the wind power generator in the ice layer thickness sequence, a formula for calculating being specifically as follows:

$$\frac{dt_i}{dt}=-\frac{A(T_s-T_a)}{\rho Lc_pkt_i};$$

in the formula, $T_s$ represents a set de-icing temperature; $T_a$ represents a current actual temperature at the icing position; $\rho$ presents a material density at the corresponding position of the surface of the blade of the wind power generator; and $c_p$ represents a specific heat capacity at the corresponding position of the surface of the blade of the wind power generator; k represents the heat conductivity of the material of the blade of the wind power generator; and $t_i$ represents an initial thickness of the ice layer;

Step S402, judging whether an ice layer weight difference among the blades of the wind power generator exceeds a preset weight difference according to ice layer thickness sequences; and if not, setting heating de-icing temperature for all icing positions according to ice layer thickness change rates to keep de-icing speed consistent at the all icing positions; and if yes, proceeding to Step S403;

the preset weight difference being a self-defined parameter;

Step S403, firstly de-icing one or two blades with a relatively large weight, and returning to Step S402 when ice layer weights on three blades are kept consistent;

Further, steps of calculating the de-icing scheme are as follows:

Step S501, constructing graph network data according to the ice layer thickness sequence;

where the graph network data includes nodes and edges between the nodes;

the nodes each are generated by information mapped from an ice layer thickness at an icing position; and an existence of an edge between nodes indicates that two icing positions are adjacent to each other or the ice layers at two icing positions are connected to each other;

Step S502, dividing the graph network data into several sub-graphs, where there is no edge between the nodes in two sub-graphs; and Step S503: respectively inputting the several sub-graphs into a heating prediction model, and outputting a predicted heating de-icing temperature for each icing position.

Further, training samples for training the heating prediction model includes:

setting an ice layer covering several icing positions, and heating one icing position of the several icing positions as sample data of one training sample; and acquiring temperature changes of the icing position and other adjacent icing positions as sample labels of the training sample.

The beneficial effects of the present disclosure are: first, the parameters acquired by the temperature sensor are corrected to avoid that a discrepancy between the temperature acquired by it and the actual temperature of the surface of the wind power generator; and second, when performing de-icing treatment on ice layers, weight differences that may exist among three blades are taken into account, and synchronous de-icing operations are performed after eliminating the weight differences, so that compared with general de-icing methods, ice treatment can be achieved without shutdown, and the stable operation of the wind power generator during the de-icing process can be ensured.

DETAILED DESCRIPTION OF THE EMBODIMENTS

Figure 1:
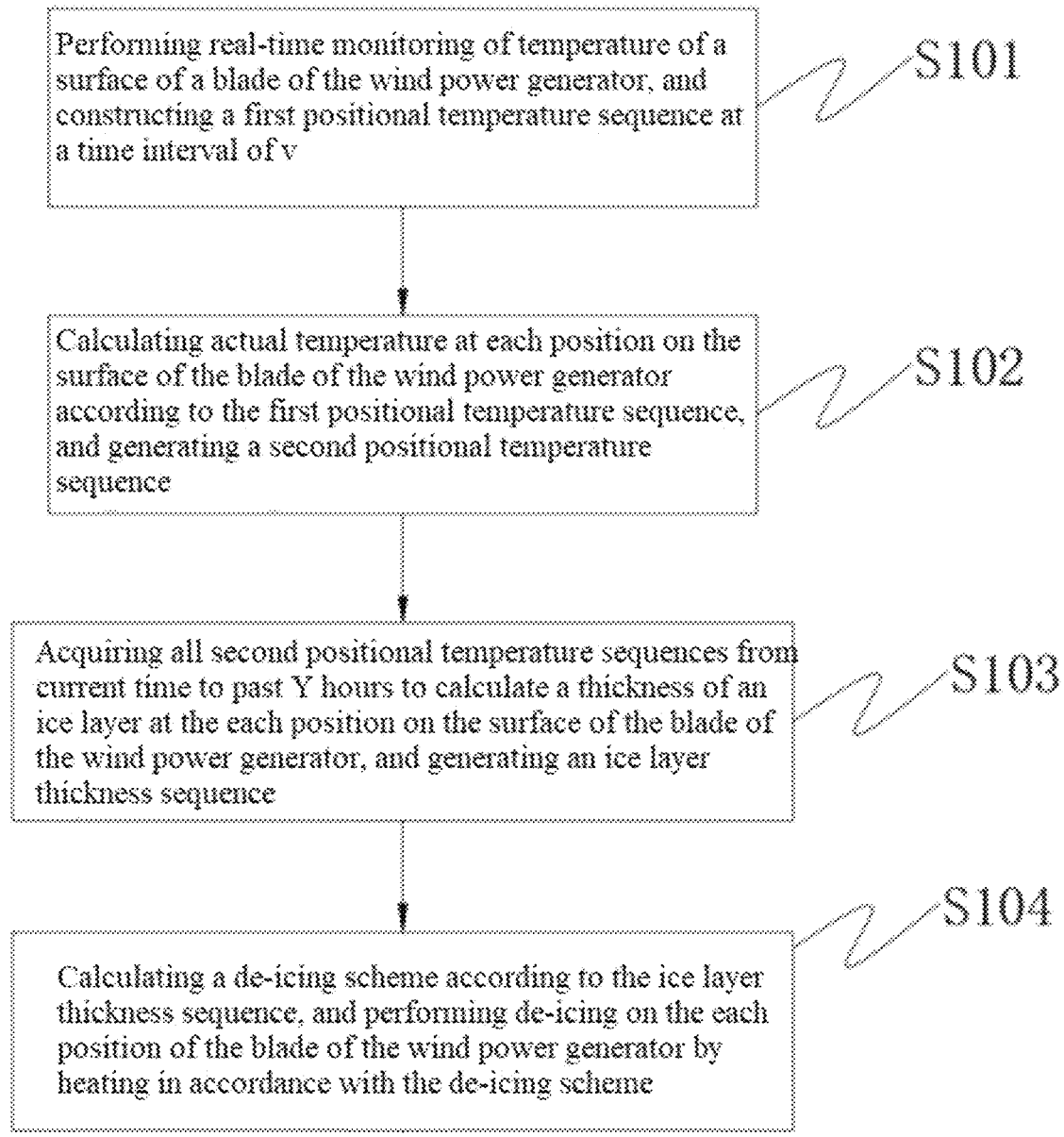
FIG. 1 is an overall process block diagram of the present disclosure.
Figure 2:
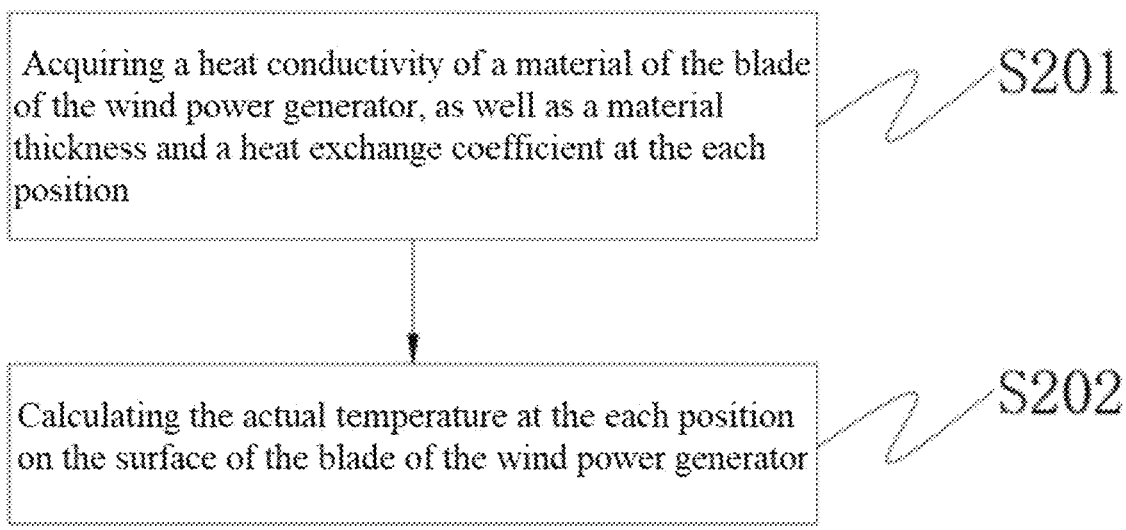
FIG. 2 is a process block diagram of calculating the actual temperature at each position of the surface of a blade of a wind power generator of the present disclosure.
Figure 3:
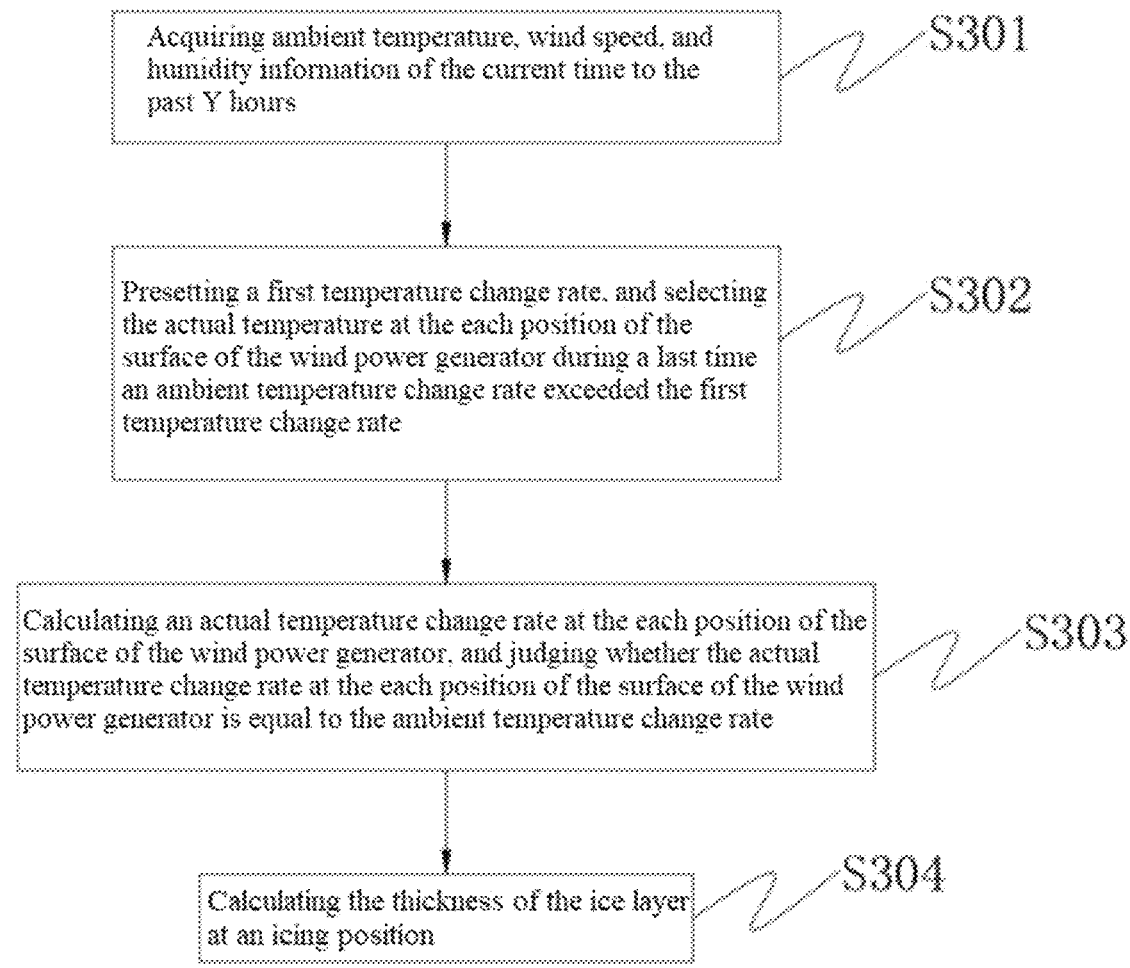
FIG. 3 is a process block diagram of calculating the ice layer thickness at each position of the surface of a blade of the wind power generator of the present disclosure.
Figure 4:
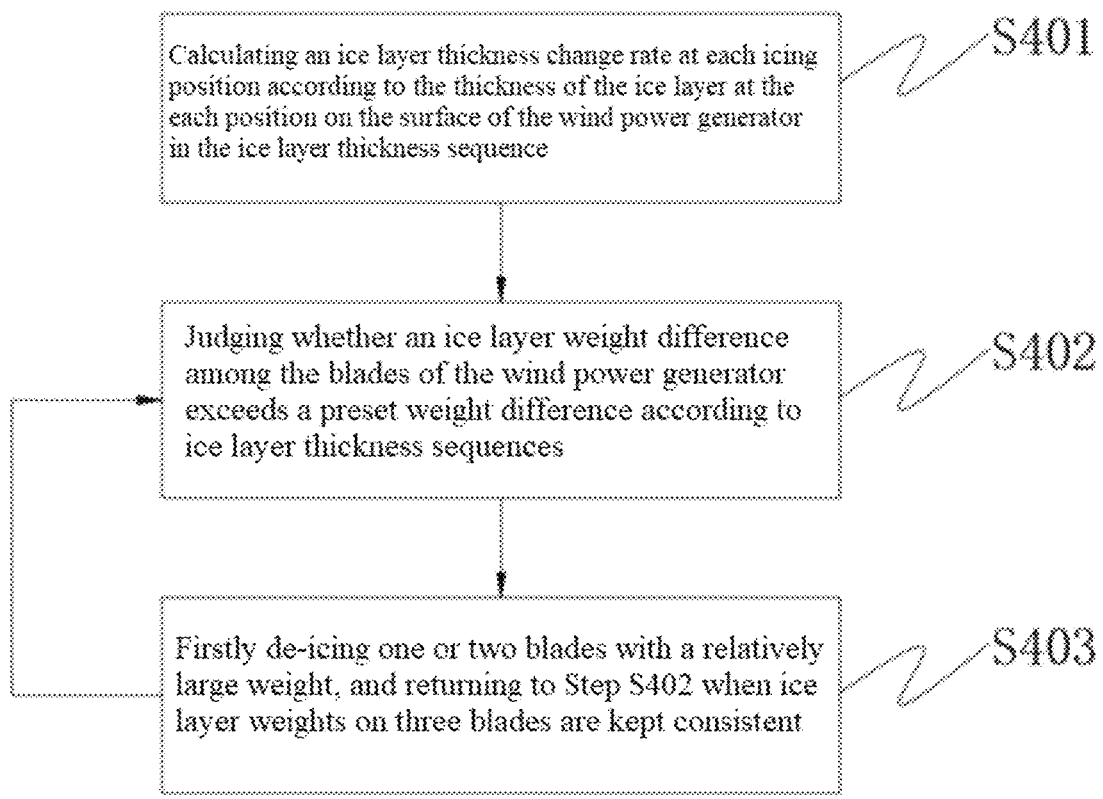
FIG. 4 is a process block diagram of calculating a de-icing scheme of the present disclosure.

As shown in FIGS. 1 to 4, the purpose of Embodiment One of the present disclosure is as follow: for the treatment of the icing phenomenon on the surface of a wind power generator, the method of heating for de-icing is generally adopted; however, since the wind power generator is huge in volume and accurate positioning of the icing site is relatively difficult, it is only possible to perform overall heating on the surface of the wind power generator, which may result in more energy waste. Therefore, there is proposed a control method for de-icing blades of a wind power generator, including the following steps:

Firstly, it is necessary to acquire the temperature of the surface of a blade of the wind power generator; and therefore, in step S101, real-time monitoring of temperature of a surface of a blade of the wind power generator is performed, and a first positional temperature sequence is constructed at a time interval of v, the first positional temperature sequence including u units, and 1 unit representing temperature at a corresponding position on the surface of the blade of the wind power generator;

A temperature sensing device is disposed at each position within the blade of the wind power generator, and the temperature of the surface of the blade of the wind power generator is acquired through the temperature sensing device at the each position. Preferably, the temperature sensing device is provided as a temperature sensor, which belongs to the prior art and will not be described herein in detail.

It should be noted that the temperature sensing device is disposed at the each position within the blade of the wind power generator, so that the temperature of the inner surface of the blade of the wind power generator can be acquired in real time. Due to the influence of the material and the structural design of the blade of the wind power generator, a heat conduction difference is caused, so that the temperature of the outer surface and the temperature of the inner surface of the blade of the wind power generator can be different;

As can be seen from the above, the temperature acquired by the temperature sensing device needs to be corrected. Therefore, in step S102, actual temperature at each position on the surface of the blade of the wind power generator is calculated according to the first positional temperature sequence, and a second positional temperature sequence is generated;

step of calculating the actual temperature at the each position on the surface of the blade of the wind power generator includes:

Step S201, acquiring a heat conductivity of a material of the blade of the wind power generator, as well as a material thickness and a heat exchange coefficient at the each position;

Step S202, calculating the actual temperature at the each position on the surface of the blade of the wind power generator, a formula for calculating being specifically as follows:

$$T_{surf} \approx T_{int} + \frac{T_{int} - T_{amb}}{\frac{t}{k} + \frac{1}{h-A}};$$

in the formula, $T_{int}$ represents the temperature acquired by the temperature sensing device; k represents the heat conductivity of the material of the blade of the wind power generator; $T_{amb}$ represents ambient temperature; h represents the heat exchange coefficient of the material of the blade of the wind power generator; A represents a heat conduction area of the corresponding position; and t represents the material thickness at the corresponding position on the blade of the wind power generator.

In addition, considering that the three blades of the wind power generator are in a motion state, the icing amount (i.e., weight) on the surface of each blade generally differs. When the difference is relatively large, the phenomenon of dynamic unbalance of the wind power generator is caused, so that it is also necessary to calculate the icing amount at the each position of the surface of the blade of the wind power generator, so as to control the de-icing temperature in the later period;

Accordingly, in Step S103, all second positional temperature sequences from current time to past Y hours are acquired to calculate a thickness of an ice layer at the each position on the surface of the blade of the wind power generator, and an ice layer thickness sequence is generated, the ice layer thickness sequence including u units, and 1 unit representing the thickness of the ice layer at a corresponding position on the surface of the blade of the wind power generator;

In addition, due to the design of the blades of the wind power generator, the windward side of the wind power generator needs to emphasize aerodynamic efficiency and needs to be designed with a smooth curved surface, while its leeward side only needs to reduce airflow diversion to maintain the blade stability and needs to be designed with flat surface. Therefore, at the beginning of the design, the windward side and the leeward side of the wind power generator have the differences in shape, smoothness, and material. Therefore, a phenomenon may occur where, at different positions, the temperature is the same but the ice layer thickness differs. Therefore, step of calculating the thickness of the ice layer at the each position on the surface of the blade of the wind power generator includes:

Step S301, acquiring ambient temperature, wind speed, and humidity information from the current time to the past Y hours;

Step S302: presetting a first temperature change rate, and selecting the actual temperature at the each position of the surface of the wind power generator during a last time an ambient temperature change rate exceeded the first temperature change rate;

the first temperature change rate being a self-defined parameter;

Step S303, calculating an actual temperature change rate at the each position of the surface of the wind power generator, and judging whether the actual temperature change rate at the each position of the surface of the wind power generator is equal to the ambient temperature change rate; and if yes, determining that icing occurs at the corresponding position, and proceeding to Step S304; and if not, determining that icing does not occur, and ending;

Step S304, calculating the thickness of the ice layer at an icing position.

It should be noted that, when acquiring the ambient temperature from the current time to the past Y hours in Step S301, it is required that the ambient temperature within the past Y hours should not exceed 0° C., so as to avoid inaccurate judgment caused by the melting of the ice layer on the surface of the blade of the wind power generator;

the first temperature change rate indicating that the temperature changes rapidly in a relatively short time, for example, the temperature rises or decreases by 1° C. within one hour.

Then, the thickness of the ice layer can be calculated according to the temperature change rate at the icing position as well as the ambient temperature, wind speed, and humidity information from the current time to the past Y hours. Therefore, a method for acquiring the thickness of the ice layer at the icing position is specifically as follows:

presetting M ice layer thicknesses, each ice layer thickness corresponding to one temperature change rate, and matching a corresponding ice layer thickness according to the actual temperature change rate at the each position of the surface of the blade of the wind power generator during the last time the ambient temperature change rate exceeded the first temperature change rate, and denoting the corresponding ice layer thickness as an initial ice layer thickness $h_{initial}$;

a current ice layer thickness $h_{current}$ is calculated according to the initial ice layer thickness and the ambient temperature $T_{amb}$, the wind speed $V_{wind}$, and the humidity information $f_{humidity}$, a formula for calculating being specifically as follows:

$$h_{current} = h_{initial} + \alpha \times (T_{dew\ point} - T_{amb}) \times V_{wind} \times t_1 \times (f_{humidity} \times \beta);$$

in the formula, $\alpha$ presents a self-defined empirical coefficient; $T_{dew\ point}$ represents an environment dew point temperature, i.e., the temperature at which water vapor in the air begins to condense into ice; $t_1$ represents a time interval from occurrence of the initial ice thickness to the current time; $\beta$ represents a weight parameter related to the humidity information $f_{humidity}$ and is a self-defined parameter.

Since the thickness of the current ice layers at different positions of the surfaces of the different blades is different, the overall operation of the wind power generator is unbalanced, the de-icing temperature and the de-icing time for different positions need to be adjusted to ensure that the three blades can return to a balance state as soon as possible. Therefore, in Step S104, a de-icing scheme is calculated according to the ice layer thickness sequence, and de-icing is performed on the each position of the blade of the wind power generator by heating in accordance with the de-icing scheme;

the de-icing scheme including de-icing temperature for the each position of the blade of the wind power generator;

steps of calculating the de-icing scheme being as follows:

Step S401, calculating an ice layer thickness change rate $dt_i/dt$ at each icing position according to the thickness of the ice layer at the each position on the surface of the wind power generator in the ice layer thickness sequence, a formula for calculating being specifically as follows:

$$\frac{dt_i}{dt} = -\frac{A(T_s - T_a)}{\rho L c_p k t_i}$$

in the formula, $T_s$ represents a set de-icing temperature; $T_a$ represents a current actual temperature at the icing position; $\rho$ presents a material density at the corresponding position of the surface of the blade of the wind power generator; and $c_p$ represents a specific heat capacity at the corresponding position of the surface of the blade of the wind power generator; k represents the heat conductivity of the material of the blade of the wind power generator; and $t_i$ represents an initial thickness of the ice layer;

Step S402, judging whether an ice layer weight difference among the blades of the wind power generator exceeds a preset weight difference according to ice layer thickness sequences; and if not, setting heating de-icing temperature for all icing positions according to ice layer thickness change rates to keep de-icing speed consistent at the all icing positions; and if yes, proceeding to Step S403;

the preset weight difference being a self-defined parameter;

Step S403, firstly de-icing one or two blades with a relatively large weight, and returning to Step S402 when ice layer weights on three blades are kept consistent;

It is worth noting that since the thickness of the ice layer may reflect the weight of the ice layer to a certain extent, when calculating the weight of the ice layer based on the thickness of the ice layer at each location, the result obtained by successively summing the thickness of each ice layer and then multiplying by a proportionality coefficient is regarded as the weight of the ice layer. The proportionality coefficient is obtained by multiplying the number of connected icing positions by the the heat conduction area corresponding to each of the icing positions.

Y, u, and v are self-defined parameters, preferably, Y is set to 20, v is set to 10, and u is set according to the actual size of the wind power generator.

Figure 5:
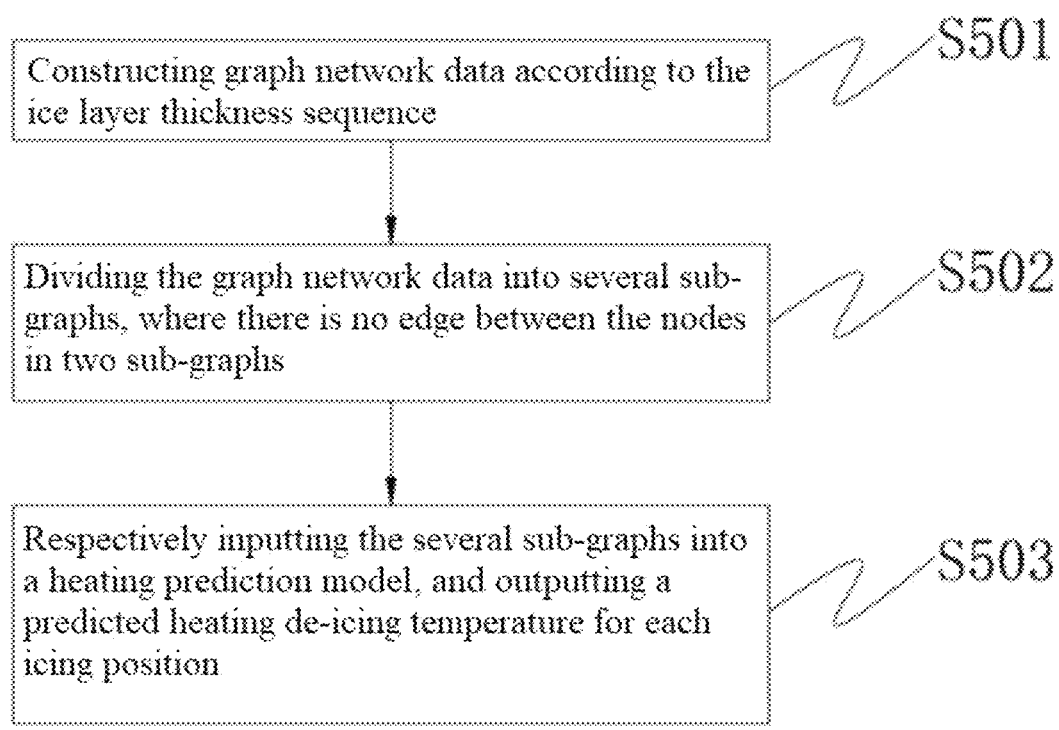
FIG. 5 is a process block diagram of Embodiment Two of the present disclosure.

As shown in FIG. 5, the purpose of Embodiment Two of the present disclosure is that, during the de-icing operation, the ice layers at adjacent positions may affect each other during melting, for example, if the ice layer at one position is relatively thick, the temperature during performing de-icing heating on the ice layer is relatively high, which may affect the surrounding icing positions. Therefore, the steps for calculating the ice-melting scheme are as follows:

Step S501, constructing graph network data according to the ice layer thickness sequence;

where the graph network data includes nodes and edges between the nodes;

the nodes each are generated by information mapped from an ice layer thickness at an icing position; and an existence of an edge between nodes indicates that two icing positions are adjacent to each other or the ice layers at two icing positions are connected to each other;

Step S502, dividing the graph network data into several sub-graphs, where there is no edge between the nodes in two sub-graphs; and Step S503: respectively inputting the several sub-graphs into a heating prediction model, and outputting a predicted heating de-icing temperature for each icing position.

It should be noted that after the graph network data is divided into the several sub-graphs, the calculation amount can be effectively reduced, and the calculation speed is improved.

Before the heating prediction model is put into use, it needs to be trained. Therefore, training samples for training the heating prediction model includes:

setting an ice layer covering several icing positions, and heating one icing position of the several icing positions as sample data of one training sample; and acquiring temperature changes of the icing position and other adjacent icing positions as sample labels of the training sample.

The examples of the present embodiments are described above, but the present embodiments are not limited to the specific implementations described above, and the specific implementations described above are merely illustrative and not restrictive, and a person of ordinary skill in the art may also make many forms under the motivation of the present embodiments, which are all within the protection of the present embodiments.

The invention claimed is:

1. A control method for de-icing blades of a wind power generator, comprising the following steps:

Step S101: performing real-time monitoring of temperature of a surface of a blade of the wind power generator, and constructing a first positional temperature sequence at a time interval of v, the first positional temperature sequence comprising u units, and 1 unit representing temperature at a corresponding position on the surface of the blade of the wind power generator;

Step S102: calculating actual temperature at each position on the surface of the blade of the wind power generator according to the first positional temperature sequence, and generating a second positional temperature sequence;

Step S103: acquiring all second positional temperature sequences from current time to past Y hours to calculate a thickness of an ice layer at the each position on the surface of the blade of the wind power generator, and generating an ice layer thickness sequence, the ice layer thickness sequence comprising u units, and 1 unit representing the thickness of the ice layer at a corresponding position on the surface of the blade of the wind power generator; and Step S104: calculating a de-icing scheme according to the ice layer thickness sequence, and performing de-icing on the each position of the blade of the wind power generator by heating in accordance with the de-icing scheme;

the de-icing scheme comprising de-icing temperature for the each position of the blade of the wind power generator; and Y, u, and v being self-defined parameters;

wherein a temperature sensor is disposed at the each position within the blade of the wind power generator, and the temperature of the surface of the blade of the wind power generator is acquired through the temperature sensor at the each position; and wherein step of calculating the actual temperature at the each position on the surface of the blade of the wind power generator comprises:

Step S201: acquiring a heat conductivity of a material of the blade of the wind power generator, as well as a material thickness and a heat exchange coefficient at the each position;

Step S202: calculating the actual temperature $T_{surf}$ at the each position on the surface of the blade of the wind power generator, a formula for calculating being specifically as follows:

$$T_{surf} = T_{int} + \frac{T_{int} - T_{amb}}{\frac{t}{k} + \frac{1}{h - A}};$$

in the formula, $T_{int}$ represents the temperature acquired by the temperature sensor; k represents the heat conductivity of the material of the blade of the wind power generator; $T_{amb}$ represents ambient temperature; h represents the heat exchange coefficient of the material of the blade of the wind power generator; A represents a heat conduction area of the corresponding position; and t represents the material thickness at the corresponding position on the blade of the wind power generator.

2. The control method for de-icing blades of the wind power generator according to claim 1, wherein step of calculating the thickness of the ice layer at the each position on the surface of the blade of the wind power generator comprises:

Step S301, acquiring ambient temperature, wind speed, and humidity information of the current time to the past Y hours;

Step S302: presetting a first temperature change rate, and selecting the actual temperature at the each position of the surface of the wind power generator during a last time an ambient temperature change rate exceeded the first temperature change rate;

wherein the first temperature change rate being a self-defined parameter;

Step S303, calculating an actual temperature change rate at the each position of the surface of the wind power generator, and judging whether the actual temperature change rate at the each position of the surface of the wind power generator is equal to the ambient temperature change rate; and if yes, determining that icing occurs at the corresponding position, and proceeding to Step S304; and if not, determining that icing does not occur, and ending; and Step S304, calculating the thickness of the ice layer at an icing position.

3. The control method for de-icing blades of the wind power generator according to claim 2, wherein a method for acquiring the thickness of the ice layer at the icing position is specifically as follows:

presetting M ice layer thicknesses, each ice layer thickness corresponding to one temperature change rate, and matching a corresponding ice layer thickness according to the actual temperature change rate at the each position of the surface of the blade of the wind power generator during a last time the ambient temperature change rate exceeded the first temperature change rate, and denoting the corresponding ice layer thickness as an initial ice layer thickness $h_{initial}$.

4. The control method for de-icing blades of the wind power generator according to claim 3, wherein a current ice layer thickness $h_{current}$ is calculated according to the initial ice layer thickness and the ambient temperature $T_{amb}$, the wind speed $V_{wind}$, and the humidity information $f_{humidity}$, a formula for calculating being specifically as follows:

$$h_{current}=h_{initial}+\alpha\times(T_{dew\ point}-T_{amb})\times V_{wind}\times t_1\times(f_{humidity}\times\beta);$$

in the formula, $\alpha$ presents a self-defined empirical coefficient; $T_{dew\ point}$ represents an environment dew point temperature; $t_1$ represents a time interval from occurrence of the initial ice thickness to the current time; $\beta$ represents a weight parameter related to the humidity information $f_{humidity}$ and is a self-defined parameter.

5. The control method for de-icing blades of the wind power generator according to claim 1, wherein steps of calculating the de-icing scheme are as follows:

Step S501, constructing graph network data according to the ice layer thickness sequence;

wherein the graph network data comprises nodes and edges between the nodes;

the nodes each are generated by information mapped from an ice layer thickness at an icing position; and an existence of an edge between nodes indicates that two icing positions are adjacent to each other or the ice layers at two icing positions are connected to each other;

Step S502, dividing the graph network data into several sub-graphs, wherein there is no edge between the nodes in two sub-graphs; and Step S503: respectively inputting the several sub-graphs into a heating prediction model, and outputting a predicted heating de-icing temperature for each icing position.

6. The control method for de-icing blades of the wind power generator according to claim 5, wherein training samples for training the heating prediction model comprises:

setting an ice layer covering several icing positions, and heating one icing position of the several icing positions as sample data of one training sample; and acquiring temperature changes of the icing position and other adjacent icing positions as sample labels of the training sample.

* * * * *